United States Patent [19]

Rauffer

[11] 4,143,953
[45] Mar. 13, 1979

[54] MICROFILM READER

[75] Inventor: Walter Rauffer, Munich, Fed. Rep. of Germany

[73] Assignee: Agfa-Gevaert AG., Leverkusen, Fed. Rep. of Germany

[21] Appl. No.: 834,495

[22] Filed: Sep. 19, 1977

[30] Foreign Application Priority Data

Sep. 25, 1976 [DE] Fed. Rep. of Germany ....... 2643287

[51] Int. Cl.$^2$ ............................................. G03B 21/11
[52] U.S. Cl. ................................... 353/27 R; 353/22; 353/120
[58] Field of Search ................... 353/121, 122, 35, 22, 353/27 R

[56] References Cited

U.S. PATENT DOCUMENTS

| | | | |
|---|---|---|---|
| 3,191,490 | 6/1965 | Rabinow | 353/35 X |
| 3,319,518 | 5/1967 | Carlson | 353/27 R X |
| 3,352,201 | 11/1967 | Brownscombe | 353/27 X |
| 3,799,664 | 3/1974 | Nicholson | 353/120 X |

FOREIGN PATENT DOCUMENTS 1272894  8/1961  France ...................................... 353/114

Primary Examiner—Harry N. Haroian

[57] ABSTRACT

Microfilm is inserted between two or more parallel, transparent, laterally invertible support plates placed in a light path emanating from a light source and travelling to a projection objective. The plates are placed in a tray which can be slided in two directions normal to the light path. The microfilm located more closely to the reader is in proper position for one or more projection objectives. For reading the microfilm located on the other side, the plates are inverted in order to bring this film in proper reading position.

8 Claims, 2 Drawing Figures

MICROFILM READER

BACKGROUND OF THE INVENTION

1. Field of the Invention

This invention relates to a microfilm reader for simultaneous processing of several microfilms.

2. Description of the Prior Art

Microfilm readers having more than one micropicture stacked in parallel planes between a light source and a projection objective are known. Such an arrangement is shown in U.S. Pat. No. 3,319,518. In this disclosure is shown that the projection objective can be movably positioned in the direction of the projection axis. When reading the microfilm, located more remote from the objective than the first microfilm, the projected image generally has poor picture quality, since the further removed microfilm has to be projected through those films closer to the objective. The resulting loss in picture quality can be tolerated only when no more than two successive microfilms are involved. However, if more than two microfilms are stacked in the light beam, then the picture quality of those microfilms further positioned than two-fold the distance from the projection objective suffers to such a degree that it has been considered impractical to use a microfilm reader with more than two microfilms following each other. However, there is a need for a system wherein as large as possible a number of microfilms is combined into one operational unit for avoiding the time consuming exchange of microfiches.

SUMMARY OF THE INVENTION

1. Purposes of the Invention

It is an object of the invention to provide a system for reading microfilms combining an optimal optical picture quality of the reproduced information with a maximum number of microfilms mounted in one operational unit. Another object of the invention is to provide a system for a number of microfilms which are easily and reproducibly placed in reading position. It is another object of the invention to provide a highly transparent support system for placing the microfilms into the light beam.

These and other objects and advantages of the present invention will become evident from the description which follows.

2. Brief Description of the Invention

The invention relates to a microfilm reader having a sequence of stacked micropictures in parallel planes between a light source and a projection objective. The microfilms are placed between two or more parallel, transparent, laterally invertible support plates for production of the micropictures if positioned relatively closest to the projection objective. The plates are placed in a tray which is slidable in one or two directions normal to the direction of the light path. The microfilms located between the plates in the tray and relatively closest to the projection objective are in proper reproduction position. Preferably at least five transparent laterally invertable support plates are employed for inserting at least four microfiches and the objective is adjustably mounted for properly focusing at least two of these microfiches located relatively more closely to the objective. Preferably the plates are positively and releasably fastened together possibly by pin means. The transparent plates are preferably of equal thickness and the part of the transparent plate in contact with the microfiche is tessellated and the size of each transparent tessella corresponds in size to a single micropicture and the grid between the tessella corresponds to the grid between the individual micropictures. Preferably the tray can be shaped as a tank having a window of the size of a microfiche in its bottom and the plates are positively engaged by the tray. The tray with the plates can be dually attachable to a stand, which also supports a light source and objectives; this arrangement is adapted for reversing the relative spacing and position of the microfiches with respect to the objective. In any case the plates provide a cassette for placing the microfilms in dual positions. The procedure includes inserting the cassette of microfilms in the reader, reading one or more of the microfilms which are accessible in this position, laterally inverting the position of the cassette in the reader and reading one or more of the microfilms which are thereby brought in accessible position. The invention employs several parallel transparent support plates which form one operational unit. Between each two of the support plates a microfiche is place. A first number of these microfiches are properly placed relatively to the optical imaging process and the remaining number of microfiches is relatively positioned in the proper position laterally or vertically inverted in between the support plates. The plates are releasably connected to a tray which can be slided in two directions parallel to the support plates.

This arrangement permits in a simple fashion by turning of the support plate unit to bring the desired half of the microfilm information into a correct reading position. As a result of this arrangement the optical quality of the reproduced micropictures is considerably improved, since the further removed microfiches can be brought in the position close to the projection objective for reading. Compared to conventional techniques, already two parallel microfiches provide the advantage that each of the two microfiches can be selectively placed in close position relative to the objective and there is in this case no need for projecting the microfiche further away from the objective through the microfiche close to the objective and there is no loss in picture quality compared to the conventional technique.

A further preferred embodiment of the invention provides that at least five transparent support plates are employed for inserting at least four microfiches and that an adjustable projection objective is employed, which selectively can be focused onto at least two of these microfiches. The adjustable objective projection arrangement can be formed in a conventional manner by an objective movable along the projection axis. In case four parallel microfiches are employed two objectives, one of which focuses the closest microfiche plane and the other the second closest microfiche plane, form the objective unit. This arrangement provides a unit which can handle twice as much microfiche information as a conventional unit without loss in picture reproduction quality. Such a relatively large storage of information which comprises e.g. for four microfiches having as dimensions 18 cm × 24 cm with 4800 individual micropictures obviates for many users a separate storage unit for those microfiches not presently in the microfilm reader. In many cases the four microfiches mountable in the apparatus are completely satisfactory.

Preferably the transparent support plates are provided with a fastening mechanism for easy introduction of the microfiches between the plates and for easy exchange against other microfiches when desired.

In addition the part of the transparent support plate in contact with the microfiches is honeycombed with rectangular honey combs corresponding in size to the size of the micropictures and the grids of the honey combs correspond to the grids between individual micropictures. A tessellated structure results for the support plate with each tessella corresponding in size to a micropicture and the grids between the tesella matching the grid between individual micropictures. This advantageously increases the transparency of the support plate unit, reduces its weight and concurrently keeps the individual micropictures safe in their position.

The invention accordingly consists in the features of construction, combination of elements, arrangement of parts and series of steps which will be examplified in the device hereinafter described and of which the scope of application will be indicated in the appended claims.

BRIEF DESCRIPTION OF THE DRAWING

In the accompanying drawing in which is shown one of the various possible embodiments of the invention.

DETAILED DESCRIPTION OF THE PREFERRED EMBODIMENTS

Figure 1:
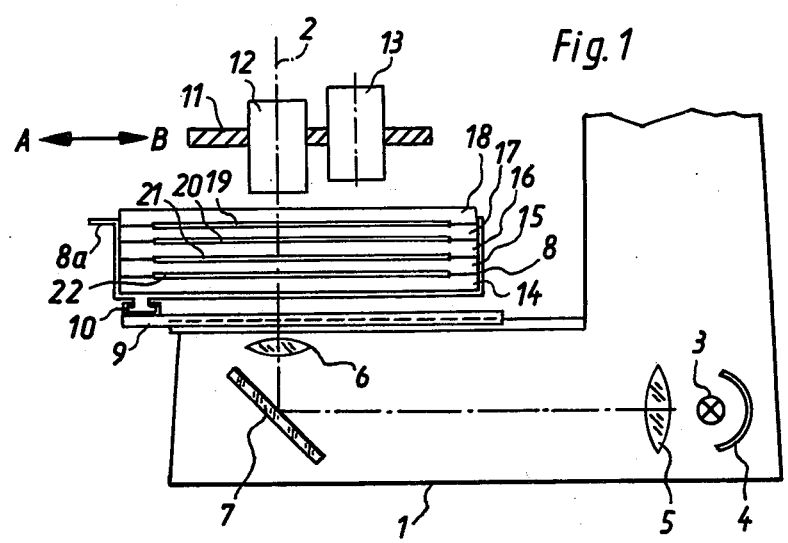
FIG. 1 is a schematic partial sectional elevation view of a microfilm reader of the present invention.

Referring now to FIG. 1, a casing 1 contains in its lower part an illumination arrangement for illuminating the micropictures placed in the projection beam path 2. This illumination arrangement can be embodied as a halogen lamp or preferably a quartz iodine lamp 3, a concave mirror 4, condenser lenses 5 and 6 and a deflection mirror 7. A tray or stage is slidably mounted on the lower part of the casing in a conventional fashion on slide bars 9 and 10 for motion in two coordinate directions normal to the projection beam path. Five transparent support plates 14 to 18 positively engage and interlock with the tray 8. The support plates have inserted four equidistant microfiches 19 and 22. A ledge 8a in front of the tray 8 functions as handle for placing the tray. A slider 11 movable in direction of arrow A-B along the casing carries two objectives 12, 13, which are placed at different levels and of which objective 12 focuses onto the plane of microfiche 20 and of which objective 13 focuses onto the plane of microfiche 19.

The two upper microfiches 19 and 20 are placed at such a level that a projection through objective 13 and 12, respectively, results in a focused picture on a display screen (not shown). The two lower microfiches 21, 22 are placed, in contradistinction, in a laterally inverted position between the support plates. For reading the two lower microfiches the user needs only remove the support plate from the tray 8, turn the unit around a horizontal axis of FIG. 1 by 180° and place the unit again into tray 8. Now the two previously lower microfiches 21 and 22 are in proper position for a focused projection.

Figure 2:
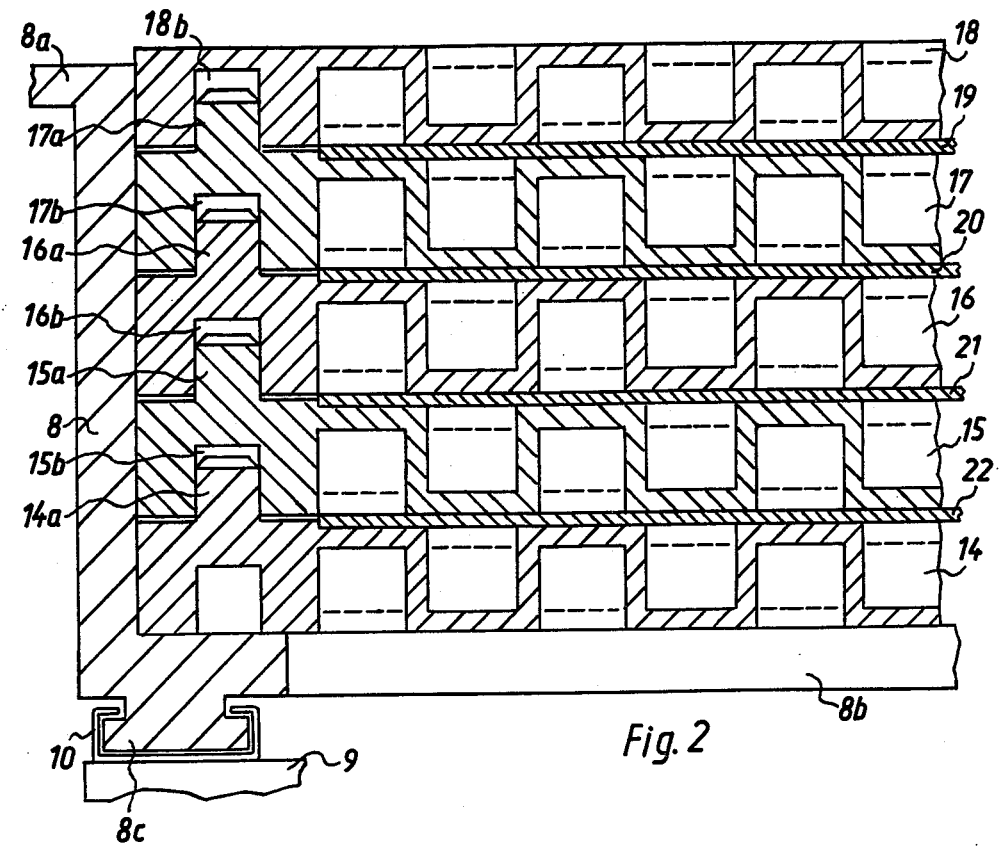
FIG. 2 is a detailed schematic partial sectional elevation view of a preferred embodiment of the present invention showing the support plates in the tray.

Referring now to FIG. 2, the tray with an inserted support plate unit is shown in more detail. The tray 8 has a window 8b in its bottom. The size of the window corresponds to the size of the microfiches and provides for unimpeded passage of the illuminating light beams. A slide ledge 8c projects from the bottom of the tray 8 and slides in slide bar 10, which in turn is mounted on slide bar 9 sliding in a vertical direction.

The support plate unit consists of four identical support plates 14 to 17 and of a cover plate 18. All five plates are of the same thickness. The center part of each is honeycombed and allows a tessellated pattern. The size of the honeycombs or tessella corresponds to a size of the individual micropictures. The individual transparent support plates are pinned together by pins 14a to 17a at their edges which project into mating recesses 15b to 19b. For exchanging the microfiches 19 to 22 held between the support plates these pin connections can be easily released.

Various changes may be made in the details and preferred embodiments of this invention without departing therefrom or sacrificing any of the advantages thereof.

It is understood, as various possible embodiments might be made of the above invention, and as various changes might be made in the embodiments above set forth, that all matter herein described or shown in the accompanying drawing is to be interpreted as illustrative and not in a limiting sense.

What is claimed is:

1. A microfilm reader comprising:
   a light source emitting a light path and operatively mounted in the reader,
   projection objective means operatively mounted in the reader transversely relative to said light path;
   at least five parallel, transparent, laterally invertible support plates mounted transversely relative to the light path between said light source and said projection objective means and adapted to support four microfiches insertable between the plates for reproduction of the microfiches; a first number of the microfiches positioned closest to the obejctive means being optically optimally positioned for focusing; and
   means for slidably supporting said support plates in one of two preselected positions which are 180° degrees spaced from each other, said support means being slidable in at least two directions normal to the light path and adapted to releasably engage the support plates; the two microfiches located closest to the objective means being in the proper reproduction position;
   said projection objective means being adjustable for properly selectively focusing on at least two planes of these microfiches located relatively closest to the objective means.

2. The microfilm reader as set forth in claim 1, wherein the plates are positively and releasably fastened together.

3. The microfilm reader as set forth in claim 2, wherein the plates are fastened together by pin means.

4. The microfilm reader as set forth in claim 1, wherein the transparent plates are of equal thickness.

5. The microfilm reader as set forth in claim 1, wherein the part of the transparent plate in contact with the microfiche is tessellated and has a grid and the size of each tessella corresponds in size to an individual micropicture and the grid between the tessella corresponds to a grid between the individual micropictures.

6. The microfilm reader as set forth in claim 1, wherein the said support means is shaped as a tank having a window of the size of a microfiche in its bottom.

7. The microfilm reader as set forth in claim 1, wherein the transparent plates positively engage the support means.

8. The microfilm reader as set forth in claim 1, comprising a stand for mounting the light source, the objective means and the support means; and
wherein the support means are in the form of a tray, said tray with the plates is dually attachable to the stand for reversing the relative spacing and position of the microfiches with respect to the objective.

* * * * *